Sept. 16, 1969      W. J. ROBICHEAUX      3,466,829
GRATING FASTENING CLIP

Filed Nov. 28, 1967      2 Sheets-Sheet 1

INVENTOR.
WARREN J. ROBICHEAUX

Sept. 16, 1969  W. J. ROBICHEAUX  3,466,829
GRATING FASTENING CLIP

Filed Nov. 28, 1967  2 Sheets-Sheet 2

INVENTOR.
WARREN J. ROBICHEAUX 3,466,829
GRATING FASTENING CLIP
Warren J. Robicheaux, Port Arthur, Tex., assignor to Gulf Oil Corporation, Pittsburgh, Pa., a corporation of Pennsylvania
Filed Nov. 28, 1967, Ser. No. 686,070
Int. Cl. E06b 3/58; E04b 5/32
U.S. Cl. 52—489          5 Claims

ABSTRACT OF THE DISCLOSURE

Two forms of grating fastening clips are provided. Each clip includes a plate member having a portion which contacts the underside of a horizontal structural supporting flange, and a J bolt which extends through the plate member and a space in the grating to hook over the top of the grating. A nut at the lower end of the J bolt at the under surface of the plate member secures the assembly together.

---

Figure 1:
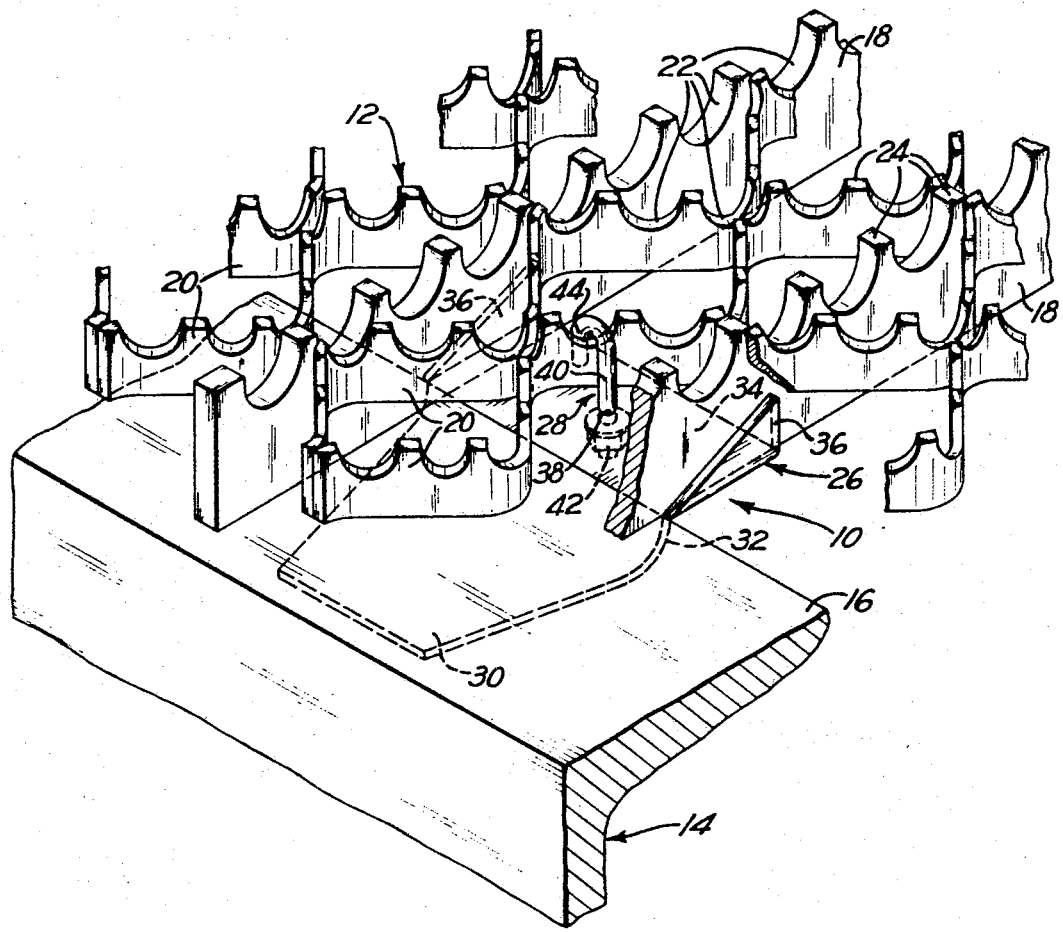

This invention relates to clips useful in attaching grating to structural members for fabricating walkways, platforms, scaffolds, and the like, in factories, refineries, on board ships, and similar applications.

More particularly, the invention is directed to clips of the character described for use with expanded metal or bar type gratings of most types. In prior usage, such gratings have been assembled for use by two general methods. The first general method comprises welding or brazing the grating directly to the structural members. This method suffers from several disadvantages including the fact that the services of highly skilled workers, welders, are required. Another disadvantage of this method is that it is often not usable in certain locations, i.e., oil refineries, chemical plants, and the like, wherein the sparks and heat generated by welding constitute a danger. Still another disadvantage of this method is that a permanent structure results. Thus, if relocation of walkways, platforms, etc., fabricated by this method should be desired because of changes within the plant or the like, an extensive reconstruction procedure is necessary.

The second general method utilizes some sort of clips or other holding means. The present invention falls into this general class. However, with most of such prior methods utilizing clips or the like, some additional fabrication step such as tack welding the clip to the structural member or to the grating itself, or drilling holes in the structural member and/or the clip is necessary. The disadvantage of these prior methods of this second general type include the fact that these additional fabrication steps such as tack welding or drilling requiring the use of relatively highly skilled workers, and also entail a danger in certain locations such as oil refineries or chemical plants because of the heat, sparks and/or electric wires that must be utilized.

The objects of the present invention include the provision of grating fastening clips of the character described which are in and of themselves simpler and less expensive to manufacture and use than prior clips, and which may be used in erection projects of the character described alone and with no additional fabrication steps of any kind such as of welding, drilling of holes, hammering or the like. Further, the clips of the present invention result in structures which are stable, strong and safe, yet at the same time easily disassembled by the same relatively unskilled workers that assembled them if such disassembly should be necessary or desirable because of changes in the plant or the like in which the structure is being used. Another advantage of the present invention is that relatively unskilled labor is all that is required to utilize the clips of the present invention to erect such structures, specifically, one to two men equipped only with a wrench.

Thus, there are provided grating fastening clips of the character described which produce stable, safe and reliable structures, inexpensive to manufacture, economical and simple to use, easy to manipulate, and generally practical and efficient to a high degree in use.

Figure 2:
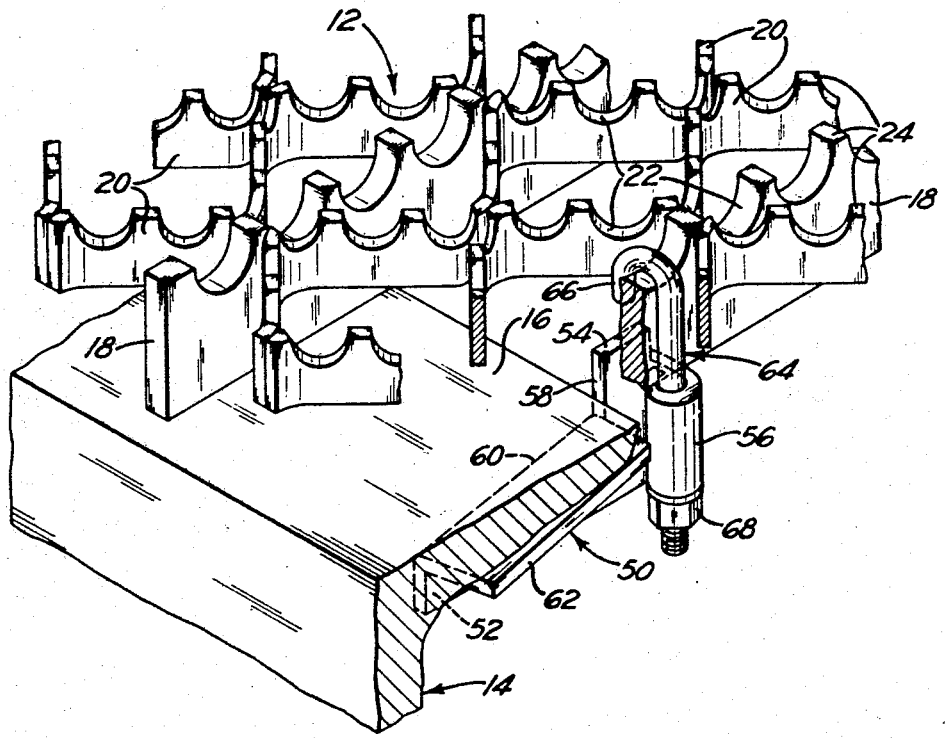
Figure 3:
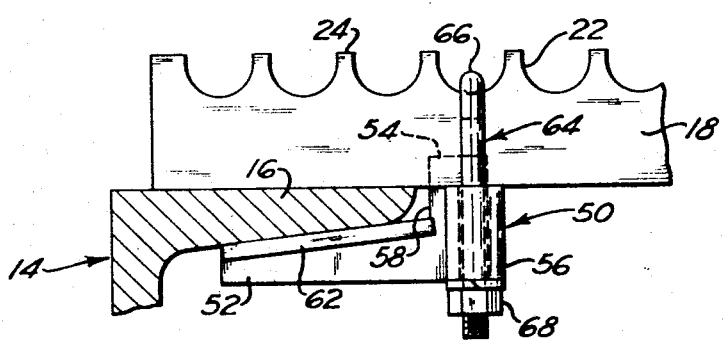

Other advantages of the invention will be pointed out or will become evident in the following detailed description and claims, and in the accompanying drawing also forming a part of the disclosure, in which: FIG. 1 is a perspective view of a first embodiment of the clip embodying the invention shown in use; FIG. 2 is a view similar to FIG. 1 showing a second embodiment of the clip of the invention; and FIG. 3 is an end elevational view of the clip shown in FIG. 2.

Referring now in detail to the drawing, 10 designates a clip assembly embodying the invention, shown in use in conjunction with a flooring type grating 12 and a structural member 14.

Structural member 14 may comprise a beam or channel or angle iron, or the like, so long as it is provided with a horizontally disposed flange 16. In the partial showing of FIGS. 1 and 2, member 14 may comprise a structural angle, an I or a wide flange beam, or a channel, it being understood that the critical criterion is the presence of the horizontal flange 16 on which the edge of grating 12 is supported.

Grating 12 shown in the drawing is illustrative only, and the grating may comprise any one of a wide variety of anti-friction gratings of the expanded metal or welded bar types which are generally available. As shown, grating 12 is fabricated of a plurality of straight supporting members 18, which are positioned at regularly spaced intervals and parallel to each other, and are joined together by lighter serpentine members 20. The members 18 and 20 are tack welded or otherwise joined together by the manufacturers of the grating at the various points of contact as dictated by the nature of the undulations of the serpentine members 20. Both the members 18 and 20 are provided with scallops or cutouts 22 along the upper edges thereof to thereby produce relatively small flats 24 which are coplanar and which constitute the anti-friction surface of the walkway. The cutouts 22, having a relatively large surface area at the plane of flats 24 produce the anti-friction quality since they serve to collect grease and other agents which might constitute a hazard if permitted to collect on the surface or at the plane of the surface which is used.

The specific grating 12 shown is known as Bustin type A-4, and is manufactured by Bustin Steel Products, Inc. of Dover, N.J., but, as will appear more clearly below, other gratings of this general type or of the expanded metal type may be used, as long as the grating has some portion cooperable with the J bolts forming part of the clip assembly of the invention.

Clip assembly 12 is in two parts, a plate member 26 and a J bolt assembly 28. Plate member 26 is of generally truncated triangular shape and comprises a holding tab portion 30 joined at its broad end by a step portion 32 to a back plate portion 34 which is in a plane generally parallel to tab portion 30. Back plate portion 34 comprises the bearing portion of this first embodiment. The height of step portion 32, and consequently the offset between the plate portions 30 and 34, is dictated by the thickness of the outer end of flange 16 of the structural member. Back plate portion 34 is provided with a pair of upwardly extending triangular shaped grating holding wings 36 formed at the outer short edges of said back plate portion. The spacing between the wings 36 is made equal to or slightly larger than the distance between a pair of the grating support members 18, whereby a section of grating will nest between said wings.

Back plate portion 34 is formed with a central opening 38 through which the shank 40 of J bolt 28 passes. A nut and washer 42 is provided at the outer threaded end of J bolt assembly 28 and bears against the underside of back plate portion 34. The hook end 44 of the J bolt is seated within one of the cutouts 22 in a serpentine member 20 of the grating 12.

The clips of the invention, embodiment 10 described above and embodiment 50 described below, are applicable for use with gratings of types other than the anti-friction grating 12 shown. For example, some gratings do not have any feature equivalent to cutouts 22. These other types of gratings may depend upon small ridges or the like formed in the bars or the like forming the grating, or may simply be plain bars in those applications where the anti-friction feature is not too important, i.e., in "clean" applications where the grating is not likely to encounter grease or the like that would make walking on the grating a hazard. When such other types of grating are used, the hook end 44 of the J bolt can be simply hooked over a bar or can be hooked onto an intersection between bars. Tightening of the nut and lock washer will secure the assembly of flange, clip and grating.

In use, grating 12, which it will be understood is supplied by the manufacturer in relatively large sheets or plates, typical dimensions being 29 5/16 inches wide by 20 feet long, are laid out on the structural members 14 in the positions in which they are to be fastened. Then it is a relatively simple task for one or two relatively unskilled workers equipped with a supply of clips and J bolt assemblies and a wrench to go about and fasten the gratings in place. The assembling may be done from either above or below the grating, and is accomplished as follows. When assembling from above, the assemblers may conveniently walk on the gratings so long as there is sufficient space in the grating openings or around the sides of the grating to reach below to tighten the nut 42 on the J bolts. In any case, a plate member 26 is first located with the tab portion 30 under the structural member with the wings 36 straddling a pair of support members 18 of the grating. Then the J bolt is dropped from above so that the hook 44 grasps the grating, and the shank 40 passes through opening 38 in portion 34. The nut and washer 42 will be threaded on the threaded end below plate portion 34 and then tightened up with the wrench to rigidify the structure. Assembly is complete.

The several advantages flowing from the first embodiment on the clip of the invention are readily apparent. Once in place, the clip will not turn with respect to the grating or structural members because of the restraining force of the wings 36, and because of the abutment of the outer edge of flange 16 against stepped portion 32. The locating of opening 38 in portion 34 is not highly critical, since the hook type attaching means provided by the J bolts 28 is highly versatile, can be swung about to grasp any convenient portion of the grating, and will tolerate a considerable amount of deviation, on the order of as much as 10°, from perpendicular to the plane of portion 34, since the nut 32 will be tightened until the structure is rigid.

Another advantage flowing from the first embodiment of the invention is that the clip is work stressed during assembly to further rigidify the final structure. Portions 30 and 34 of plate member 26 are originally fabricated so that they are generally parallel. The thickness of flange 16 shown, and the flanges of most other types of structural members increase in thickness from their outer ends inwardly. Thus, an added holding force will be generated as nut 42 is tightened because tab portion 30 will have its lower end forced downwardly with respect to the plane of portion 34, setting up an internal stress within the plate member 26, which further rigidifies the structure of clip, grating and support.

Referring now to FIG. 2, the second embodiment 50 of the clip of the invention is shown in use with the same grating 12 and structural member 14 as in FIG. 1. Clip 50 is formed from a single flat plate or sheet and comprises a main plate portion 52, an upstanding flange portion 54 coplanar with portion 52, and a rolled or curled J clip shank holding portion 56. The original sheet was cut as at 58 parallel to the axis of rolled portion 56, and scored as at 60 by a line running from the inner end of cut 58 and score 60 was bent over to form a bearing flange to the axis of rolled portion 56. The material between cut 58 and score 60 was bent over to form a bearing flange 62 extending to the same side of main plate portion 52 as rolled portion 56.

A J bolt 64 has its hook portion 66 hooked over a convenient cutout 22 in the grating, has its shank portion passing through the opening created by rolled portion 56, and is provided with a suitable nut and lock washer indicated by reference numeral 68 which bears against the lower end of the rolled portion 56.

The manner of assembling clip 50 is substantially the same as and can be easily understood from the explanation of the manner of use of clip 10 described above.

Clip 50 will not turn about the axis of the J bolt because member 18 of the grating is snugly held between upstanding flange 54 and the J bolt 64. Upon tightening the nut 68, flange 54 will be drawn tightly and rigidly against one side of member 18 to thereby prevent turning of the clip.

Clip 10 is made for a specific grating, since the space between the wings 36 must snugly receive the grating bars. Clip 50 is universal, i.e., since it cooperates with only one grating bar, one size clip 50 may be used with virtually any grating. Both clips 10 and 50 have the advantage of low cost of manufacture, relative to other clips, since they can be completely made by simple stamping and bending operations which are highly conducive to mass production. The J bolts with the nuts and washers are standard hardware items. However, clip 10 will be slightly less expensive to produce than clip 50 because the cutting and bending is slightly more complex in clip 50 than in clip 10. Thus, clip 50 is preferred where several different gratings are used at once, and clip 10 is preferred where all the grating used has a common grating bar spacing.

FIG. 3 more clearly shows certain structural relationships between the various portions of the second embodiment 50 of the clip of the invention.

While the invention has been described in detail above, it is to be understood that this detailed description is by way of example only, and the protection granted is to be limited only within the spirit of the invention and the scope of the following claims.

I claim:

1. In combination, a structural support having a horizontally disposed flange, a grating supported on said flange, fastening means to secure said grating to said flange, said fastening means comprising a plate member having a bearing portion cooperable with said flange, said plate member comprising rotation prevention means cooperable with said grating, said fastening means comprising securing means to secure said flange, said grating, and said fastening means together comprising a hook portion extending from a portion of said plate member through a space in said grating and over the top of said grating, said grating comprising a plurality of members joined together, at least one of said grating members being formed with a cutout extending downwardly from the top surface thereof, and said hook portion being positioned in said cutout in the assembled condition of said flange, said grating, and said fastening means.

2. In apparatus for fastening grating to a horizontally disposed flange of a structural support, the improvement comprising fastening means comprising a plate member having a bearing portion cooperable with said flange, said plate member comprising rotation prevention means cooperable with said grating, said fastening means comprising securing means to secure said flange, said grating, and said fastening means together comprising a hook portion extending from a portion of said plate member through a space in said grating and over the top of said grating, said portion of said plate member from which said hook portion of said securing means extends comprising a rolled portion of said plate member which defines an elongated opening through which said securing means extends, and the axis of said longitudinal opening being in spaced, parallel relation to the plane of said plate member.

3. The combination of claim 2, said bearing portion of said plate member comprising a bearing flange disposed generally perpendicular to the plane of said plate member along a line in said plane at an acute angle to said axis of said longitudinal opening.

4. The combination of claim 2, said securing means comprising a J bolt having its shank portion in said elongated opening, and said securing means comprising a nut cooperable with the lower threaded end of said J bolt and the underside of said rolled portion.

5. The combination of claim 4, said rotation prevention means comprising a flange portion of said plate member extending upwardly above the bottom surface of said grating and in contact with a portion of said grating.

References Cited

UNITED STATES PATENTS

| | | | |
|---|---|---|---|
| 2,467,877 | 4/1949 | Barry | 52—507 |
| 2,572,432 | 10/1951 | Bates | 52—664 X |
| 2,904,851 | 9/1959 | Griffin | 52—486 X |
| 3,106,271 | 10/1963 | McGee | 52—489 |

FOREIGN PATENTS 630,624  1963  Belgium.

JOHN E. MURTAGH, Primary Examiner

U.S. Cl. X.R.

52—180, 507

PO-1050
(5/69)

UNITED STATES PATENT OFFICE
CERTIFICATE OF CORRECTION

Patent No. 3,466,829      Dated September 16, 1969

Inventor(s) Warren J. Robicheaux

It is certified that error appears in the above-identified patent and that said Letters Patent are hereby corrected as shown below:

Column 4, line 3, paragraph should read as follows.

--Referring now to FIG. 2, the second embodiment 50 of the clip of the invention is shown in use with the same grating 12 and structural member 14 as in FIG. 1. Clip 50 is formed from a single flat plate or sheet and comprises a main plate portion 52, an upstanding flange portion 54 coplanar with portion 52, and a rolled or curled "J" clip shank holding portion 56. The original sheet was cut as at 58 parallel to the axis of rolled portion 56, and score as at 60 by a line running from the inner end of cut 58 downwardly at an angle to a line perpendicular to the axis of rolled portion 56. The material between cut 58 and score 60 was bent over to form a bearing flange 62 extend: to the same side of main plate portion 52 as rolled portic 56.--

SIGNED AND
SEALED
MAY 12 1970

(SEAL)
Attest:

Edward M. Fletcher, Jr.
Attesting Officer

WILLIAM E. SCHUYLER, JR.
Commissioner of Patents